Figure 1:
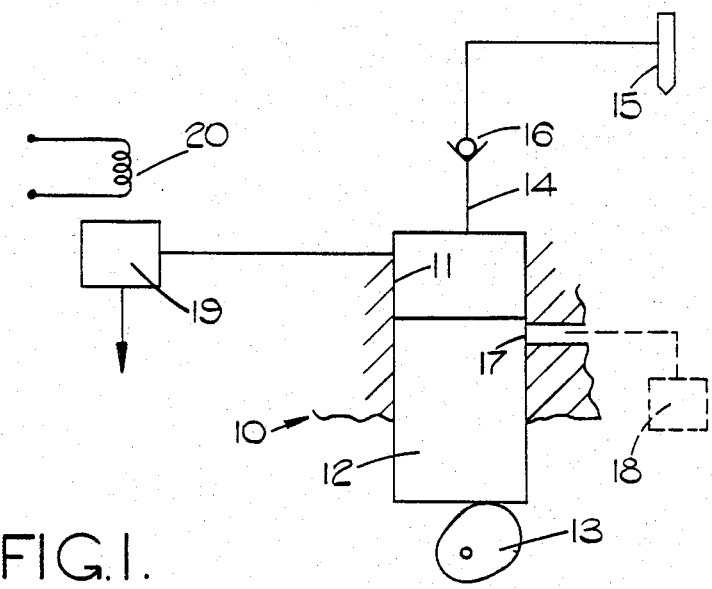

United States Patent [19]

Mowbray

[11] Patent Number: 4,509,487
[45] Date of Patent: Apr. 9, 1985

[54] FUEL SYSTEM FOR MULTI-CYLINDER ENGINE

[75] Inventor: Dorian F. Mowbray, Burnham, England

[73] Assignee: Lucas Industries Public Limited Company, Birmingham, England

[21] Appl. No.: 664,109

[22] Filed: Oct. 24, 1984

Related U.S. Application Data

[63] Continuation of Ser. No. 451,855, Dec. 21, 1982, abandoned.

[30] Foreign Application Priority Data

Dec. 24, 1981 [GB] United Kingdom ............... 8138931

[51] Int. Cl.³ ............................................. F02M 39/00
[52] U.S. Cl. ................................... 123/458; 123/459; 123/357
[58] Field of Search ............... 123/458, 459, 357, 358, 123/359, 436, 419; 73/119 A

[56] References Cited

U.S. PATENT DOCUMENTS

| | | | |
|---|---|---|---|
| 4,064,849 | 12/1977 | Latsch et al. | 123/436 |
| 4,153,013 | 5/1979 | Bianchi et al. | 123/436 |
| 4,323,042 | 4/1982 | Woodhouse et al. | 123/436 |
| 4,377,998 | 3/1983 | Hartel et al. | 123/419 |
| 4,378,775 | 4/1983 | Straubel et al. | 123/458 |
| 4,395,987 | 8/1983 | Kobayashi et al. | 123/458 |

OTHER PUBLICATIONS

SAE Technical Paper Series, Eisele, Electronic Control of Diesel Cars, 2/1980, FIG. 12.

Primary Examiner—Magdalen Y. C. Moy

[57] ABSTRACT

A fuel system for a multi-cylinder engine comprises a plurality of engine operated pumps supplying fuel to the injection nozzles respectively of an engine. Each pump has an electromagnetic valve which must be closed to cause delivery of fuel by the respective pumps. The supply of power to the windings of the valves is effected by a power module controlled by a distributor circuit which receives sequence signals to ensure that the valves are closed at the correct time and a fuel level signal to ensure that the valve is closed for the correct length of time. In order to ensure that the amount of fuel delivered through each nozzle is the same a sensor provides a pulse signal at each working stroke of the engine. The period between each signal is determined by a timer circuit and the average of a number of periods is obtained from an averaging circuit. The average period is compared with the actual value and any error is used in a compensating circuit 29 to adjust the time the respective valve is closed.

2 Claims, 2 Drawing Figures

FUEL SYSTEM FOR MULTI-CYLINDER ENGINE

This application is a continuation of application Ser. No. 451,855, filed Dec. 21, 1982 and now abandoned.

This invention relates to a fuel system for a multi-cylinder engine of the kind comprising a plurality of fuel injection pumps equal to the number of engine cylinders, and which in use are driven by a cam shaft driven by the engine, said pumps in use delivering fuel to respective injection nozzles of the engine in turn, a plurality of electrically operated valves associated with the pumps respectively, said valves being operable to ensure the supply of fuel to the associated injection nozzles and control circuit means for controlling the operation of said valves whereby the operating periods of said valves and hence the amount of fuel delivered by the pumps can be controlled in accordance with desired and actual engine operating parameters.

Such a fuel system is described in British published Specification No. 2041577A. In this system the duration of fuel delivery and hence the quantity of fuel delivered, by the pumps is determined on the basis of various actual and desired engine operating parameters and signals applied to the valves at the same time in the valve operating cycles. The assumption is made that the valves, pumps and nozzles function in an identical manner so that the quantity of fuel delivered to each engine combustion space is the same.

Manufacturing tolerances result in the various items having different operating characteristics with the result there can be differences in the fuel quantities delivered through each injection nozzle. These differences result in irregular operation of the associated engine in particular, at low engine speeds and can also result in excessive emission of noxious substances in the engine exhaust and also excessive engine noise.

The object of the invention is to provide a fuel system of the kind specified in a simple and convenient form.

Figure 2:
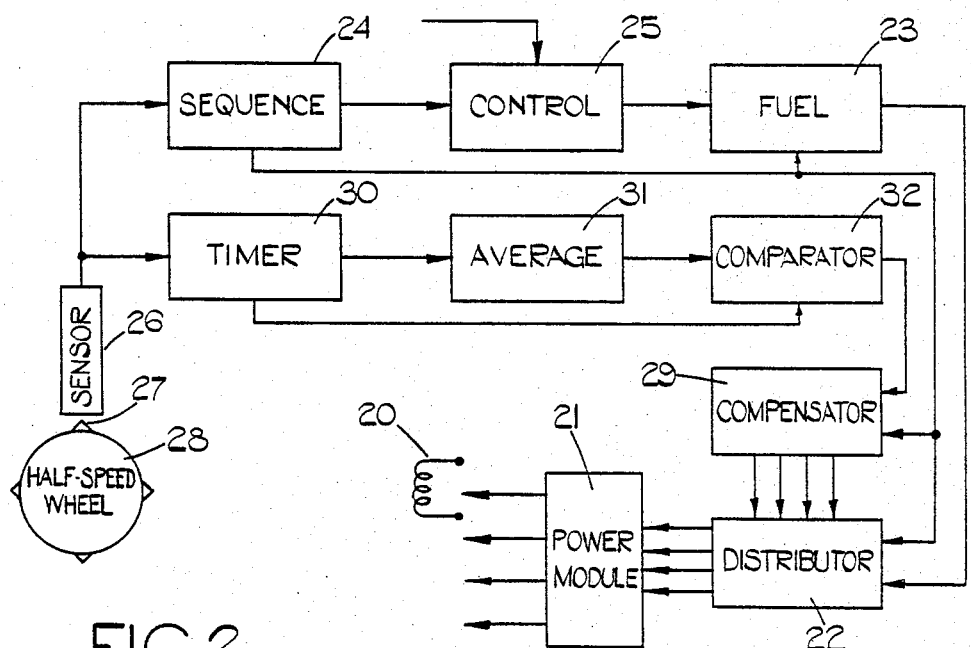

According to the invention a fuel system of the kind specified comprises transducer means for providing a pulse signal at each working stroke of the engine, means for measuring the period between successive signals, means for averaging a plurality of said periods, means for comparing each period with said average to produce error signals and means responsive to said error signals to adjust the operating periods of said valves. An example of a fuel system in accordance with the invention will now be described with reference to the accompanying drawings in which:

FIG. 1 is a diagrammatic representation of the fuel system of one cylinder of an engine and FIG. 2 is a block diagram showing the electronic components which control the operation of a valve shown in FIG. 1.

Referring to FIG. 1 of the drawings the system comprises a reciprocating plunger pump which is generally indicated at 10 and which comprises a cylinder 11 in which is mounted a reciprocable plunger 12. The plunger 12 is conveniently loaded in the outward direction by means of a spring not shown, into contact with a cam 13 which is mounted upon the cam shaft driven in timed relationship with the engine. The cylinder 11 has an outlet 14 which communicates with a fuel injection nozzle 15 by way of a spring loaded delivery valve indicated at 16.

Formed in the wall of the cylinder 11 is a filling port 17 which is uncovered by the plunger 12 when the latter moves outwardly. The port 17 communicates with a source of fuel 18. Also communicating with the cylinder 11 is a spill valve 19 which is controlled by an electromagnetic device the winding of which is indicated at 20. The valve is so arranged that the winding 20 must be energised to close the valve.

In use, during inward movement of the plunger 12 as soon as the port 17 is covered by the plunger, the fuel contained in the cylinder 11 is pressurized and if the valve 19 is closed, the fuel will be delivered through the outlet 14 to the injection nozzle 15 by way of the delivery valve 16. If during the inward movement of the plunger, the valve 19 is opened then insufficient pressure will be generated in the cylinder to open the delivery valve or the valve member in the nozzle and the fuel displaced by the plunger 12 will flow to a drain by way of the spill valve 19. During outward movement of the plunger fuel will flow into the cylinder 11 as soon as the port 17 is opened although if desired, the port 17 can be omitted and the filling of the cylinder can take place by way of the valve 19 which in this instance, is connected to the source 18 of fuel under pressure.

The portion of the system described with reference to FIG. 1 represents what is necessary to supply fuel to one injection nozzle of the engine and for a multi-cylinder engine there are as many components as shown in FIG. 1, as there are engine cylinders although it will be appreciated that only a single source of fuel is required.

Referring now to FIG. 2 of the drawings, the windings 20 of the valves 19 are connected to the outputs respectively of a so-called power module 21. The module 21 contains solid state power circuits which can be operated to cause flow of electric current in the windings 20 in response to signals provided by a so-called distributor 22. The distributor is provided with two main input signals one of which is provided by a so-called fuel circuit 23 and the other of which is provided by a sequence circuit 24. The sequence circuit provides a speed input signal to a control circuit 25 and the latter provides an input to the fuel circuit 23. The input to the sequence circuit is obtained from a sensor 26 which is positioned to provide a pulse signal each time a mark 27 provided on a wheel 28 passes the sensor. The wheel 28 is driven at half the engine speed and there are as many marks 27 as there are engine cylinders. The control 25 has an input from a transducer which is associated with the throttle control of the vehicle of which the engine forms part and considering the operation of the system so far described, the signals applied to the distributor 22 from the sequence circuit 24 determine the instant of delivery of fuel and which injection nozzle receives fuel. The duration of closure of the valves 19 is determined by the signal provided by the fuel circuit 23. The control circuit 25 and the fuel circuit 23 constitute a governor whereby the speed of the associated engine is controlled. As mentioned earlier in the specification the construction of the various components shown in FIG. 1 is such that even though the power module supplies electric current to the windings 20 at the same time during the respective working cycles, the amount of fuel delivered to the injection nozzles 15 will vary. If for example one nozzle delivers appreciably more fuel than the other nozzles, the speed of the engine will momentarily increase during the working cycle of the cylinder associated with that nozzle since more power will be produced. Similarly if a nozzle supplies less fuel the engine will slow down. In order to provide for substantially equal deliveries of fuel, the distributor 22 has further inputs from a so-called compensator circuit 29. The signals provided by the sensor 26 are supplied to a timer circuit 30 which provides signals indicative of the intervals between the pulses. These signals are supplied to a circuit 31 which on the basis of a plurality of time interval signals, produces an average signal which is supplied to a comparator 32. In addition, the comparator receives from the timing circuit the actual signal representative of the time between two pulses and the output of the comparator is the difference between the average and the actual signals. The output of the comparator is applied to the compensator circuit 29 the effect of which is to reduce in terms of time, the period during which the winding 20 of a valve is energised if it is decided that the nozzle which is associated with that winding is delivering more fuel to the engine than should be the case. If on the other hand it is decided that less fuel is being delivered by a nozzle than should be the case the winding 20 associated with that nozzle is energised for a slightly longer period. The compensator circuit also receives an input signal from the sequence circuit 24 so as to ensure that the correction signals are supplied at the appropriate time. The adjustment as described above is particularly beneficial at low engine speeds. As the engine speed increases the micro-processor which constitutes the circuits 30, 31, 32 may not have a sufficiently fast operating speed to make the necessary calculation. In this case the compensation which has been determined for the lower engine speeds is utilized taking into account the fact that the at higher engine speeds the intervals between the pulses provided by the sensor 26 will be smaller. It will be appreciated that if the amount of fuel required to be supplied to the engine varies this will be taken acccount of in the compensator circuit 29.

I claim:

1. Fuel system for a multi cylinder compression ignition engine comprising a plurality of injection pumps for delivering fuel to the injection nozzles of the engine respectively, a cam shaft for operating said pumps said cam shaft being driven in use by the associated engine, a plurality of electrically operated valves associated with the pumps respectively, said valves being operable to ensure the supply of fuel by the associated pumps to the injection nozzles, control circuit means for controlling the operation of said valves whereby the operating periods of said valves and hence the amount of fuel delivered by the pumps can be controlled in accordance with desired and actual engine operating parameters, transducer means for providing a pulse signal at each working stroke of the engine, means for measuring the period between successive pulse signals, means for producing an average period value from a plurality of said periods, means for comparing each period with said average period value to produce error signals and means responsive to said error signals for modifying the individual operating periods of said valves whereby the amount of fuel supplied to the associated engine through each nozzle will be substantially equal.

2. A fuel system according to claim 1 in which said transducer means comprises a sensor responsive to marks on a rotary member driven by the engine.

* * * * *